United States Patent Office 3,850,954
Patented Nov. 26, 1974

1

3,850,954
1-ACYL-3-AMINOSULFONYL-2-IMINO-
BENZIMIDAZOLINES
Arno Widdig, Blecher, Engelbert Kühle, Bergisch-Gladbach, Ferdinand Grewe, Burscheid, and Helmut Kaspers, Leverkusen, Germany, assignors to Bayer Aktiengesellschaft, Leverkusen, Germany
No Drawing. Filed Feb. 2, 1973, Ser. No. 329,000
Claims priority, application Germany, Feb. 9, 1972,
P 22 06 011.3
Int. Cl. C07d 49/38
U.S. Cl. 260—309.2                                5 Claims

ABSTRACT OF THE DISCLOSURE 1-acyl-3-aminosulfonyl-2-imino-benzimidazolines of the formula

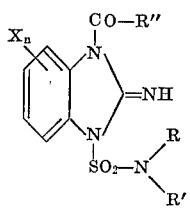

in which

X is halogen, lower alkyl or lower alkoxy,
n is 0, 1 or 2,
R and R' each independently is alkyl with 1 to 6 carbon atoms, optionally substituted by at least one of halogen, nitrile and lower alkoxy, or
R and R' together with the linking nitrogen atom form a heterocyclic ring with 4 to 7 carbon atoms optionally containing oxygen or sulfur, and
R" is alkyl with 1 to 6 carbon atoms optionally substituted by lower alkoxy or halogen, cycloalkyl with 3 to 8 carbon atoms, aralkyl optionally substituted in the aryl moiety by halogen or lower alkyl, aryl optionally substituted by at least one of halogen, lower alkyl and lower alkoxy, or alkoxy with 1 to 6 carbon atoms, which possess fungicidal properties.

The present invention relates to and has for its objects the provision of particular new 1-acyl-3-aminosulfonyl-2-imino-benzimidazolines, i.e. 1-optionally substituted-acyl-3-N,N-disubstituted - aminosulfonyl - 2 - imino-benzimidazolines which may carry up to two halogen, lower alkyl or lower alkoxy substituents on the benzene ring, which possess fungicidal properties, active compositions in the form of mixtures of such compounds with solid and liquid dispersible carrier vehicles, and methods for producing such compounds and for using such compounds in a new way especially for combating pests, e.g. fungi, with other and further objects becoming apparent from a study of the within specification and accompanying examples.

It is generally known from Pat. 2,457,674 that salts of dithiocarbamic acid, for example zinc ethylene-1,2-bis-dithiocarbamate (Compound A), can be employed for combating the plant diseases caused by Phycomycetes. Because of their high protective action these preparations have attained great importance in practice. However, the absence of any curative or even systemic action is unsatisfactory.

Furthermore it is known from Pat. 3,541,213 that various benzimidazoles display very good curative and systemic properties in the case of a series of fungal diseases of crop plants, for example 1-butylcarbamidyl-1-benzimidazole-2-carbamic acid methyl ester. However, these benzimidazoles lack activity against the mycoses caused by Phycomycetes (compare Plant Disease Reptr. (1968), 52, 95–99).

The present invention provides 1-acyl-3-aminosulfonyl-2-imino-benzimidazolines of the general formula

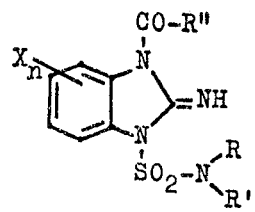

in which

X is halogen, lower alkyl or lower alkoxy,
n is 0, 1 or 2,
R and R' each independently is alkyl with 1 to 6 carbon atoms, optionally substituted by at least one of halogen, nitrile and lower alkoxy, or
R and R' together with the linking nitrogen atom form a heterocyclic ring with 4 to 7 carbon atoms optionally containing oxygen or sulfur, and
R" is alkyl with 1 to 6 carbon atoms optionally substituted by lower alkoxy or halogen, cycloalkyl with 3 to 8 carbon atoms, aralkyl optionally substituted in the aryl moiety by halogen or lower alkyl, aryl optionally substituted by at least one of halogen, lower alkyl and lower alkoxy, or alkoxy with 1 to 6 carbon atoms.

Preferably, X is chlorine, bromine, fluorine, methyl, ethyl, isopropyl, n-butyl, methoxy, ethoxy or isopropoxy; n is 0 or 1; R and R' each independently is methyl, ethyl, n-propyl, methoxyethyl or chloroethyl or R and R' together with the linking nitrogen atom are pyrrolidino, piperidino or morpholino; and R" is lower alkyl with up to 4 carbon atoms optionally substituted by methoxy or ethoxy, cyclohexyl, benzyl or phenyl optionally substituted by at least one of chlorine and methyl, or alkoxy with up to 3 carbon atoms.

It is very surprising that the 1-acyl-3-aminosulfonyl-2-imino-benzimidazolines according to the invention display an improved fungicidal activity as compared to the abovementioned zinc ethylene-1,2-bis-dithiocarbamate and show an action against Phycomycetes fungi which is lacking in the systemically fungicidal benzimidazoles. This action is not only protective but is in particular also curative and systemic in nature. The active compounds according to the invention hence represent a valuable enrichment of the art.

The invention also provides a process for the production of a 1-acyl-3-aminosulfonyl-2-imino-benzimidazoline of the formula (I) in which a 1-aminosulfonyl-2-amino-benzimidazole of the general formula

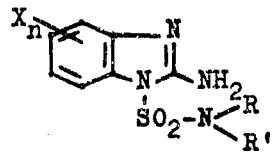

X, n, R and R' have the abovementioned meanings, is reacted either with an acylating agent, for example an acyl halide, of the general formula R"—CO—Hal        (III)

in which

R" has the abovementioned meaning and Hal represents halogen or with an anhydride of an organic acid of the general formula $$\begin{array}{c} R''-CO \\ \phantom{R''-C}\searrow \\ \phantom{R''-CCCC}O \\ \phantom{R''-C}\nearrow \\ R''-CO \end{array} \quad (IV)$$

in which

R" has the abovementioned meaning, in the presence of a diluent and acid-binding agent.

If 2-amino-1-dimethylaminosulfonyl-benzimidazole and propionic acid chloride are used as starting substances, the course of the reaction can be represented by the following formula scheme:

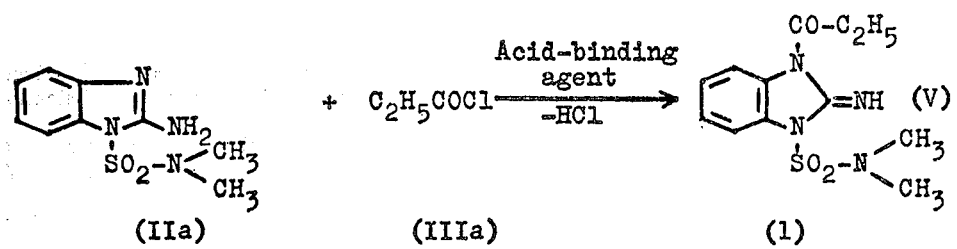

Further, if 2-amino-1-dimethylaminosulfonyl-benzimidazole and pyrocarbonic acid dimethyl ester are used as the starting substances, the course of the reaction can be represented by the following formula scheme:

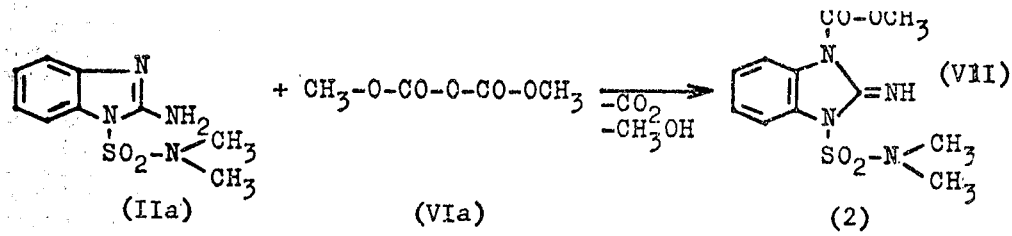

As examples of the 1-aminosulfonyl-2-aminobenzimidazole starting materials defined by the formula (II) there may be mentioned:

2-amino-1-dimethylaminosulfonyl-benzimidazole,
2-amino-1-diethylaminosulfonyl-benzimidazole,
2-amino-1-morpholinosulfonyl-benzimidazole,
2-amino-1-piperidinosulfonyl-benzimidazole,
2-amino-1-pyrrolidinosulfonyl-benzimidazole,
2-amino-5-chloro-1-dimethylaminosulfonyl-benzimidazole,
2-amino-5-methyl-1-dimethylaminosulfonyl-benzimidazole,
2-amino-5-n-butyl-1-dimethylaminosulfonyl-benzimidazole,
2-amino-5-methoxy-1-dimethylaminosulfonyl-benzimidazole,
2-amino-5-isopropoxy-1-dimethylaminosulfonyl-benzimidazole,
2-amino-5-chloro-1-diethylaminosulfonyl-benzimidazole, and
2-amino-5-n-butyl-1-morpholinosulfonyl-benzimidazole.

The 1-aminosulfonyl-2-aminobenzimidazoles can be obtained from 2-aminobenzimidazoles and sulfamic acid chlorides in suitable solvents, for example chloroform as described in application Ser. No. 328,998, filed Feb. 2, 1973.

as methylene chloride, chloroform, carbon tetrachloride and chlorobenzene; ethers, such as diethyl ether, bibutyl ether, tetrahydrofuran and dioxane; ketones, such as acetone, methyl isopropyl ketone, acetophenone and cyclohexanone; and any desired mixtures of the solvents mentioned.

As acid-binding agents it is possible in principle to use any inorganic and organic bases when carrying out the reaction according to the invention. However, the industrially easily accessible members of this category are preferably employed. As examples there may be mentioned: sodium hydroxide, potassium hydroxide, sodium bicarbonate, potassium carbonate, sodium oxide, triethylamine, N,N-dimethylbenzylamine and pyridine.

The reaction temperatures can be varied within a wide range. In general, the reaction is carried out at about 20 to 200° C., preferably about 50 to 150° C.

In carrying out the process according to the invention, 1 mole of acid halide or acid anhydride and 1 equivalent of acid-binding agent are generally employed per mole of 1-aminosulfonyl-2-aminobenzimidazole. The acylating agent and the acid-binding agent can also, without difficulty, be employed in higher proportions. The final products in part precipitate on cooling the reaction mixture and can in part be isolated by distilling off the solvent and separating off the salt formed at the same time. They can optionally be purified by re-dissolving and reprecipitation, or by recrystallization.

The active compounds according to the invention display a strong fungitoxic action and are distinguished by a broad spectrum of action. Their low toxicity to warm-blooded animals and their good toleration by higher plants permits them to be used as plant protection agents against fungal diseases. In the concentrations required for combating fungi, they do not appear to damage crop plants. Fungitoxic agents are employed in plant protection for combating fungi of the most diverse categories of fungi, such as Archimycetes, Phycomycetes, Ascomycetes, Basidiomycetes and *Fungi imperfecti*.

The active compounds according to the invention can be used against parasitary fungi on above-ground parts of plants, against fungi causing tracheomycosis, which attack the plant through the soil, and against seed-borne fungi and fungi which inhabit the soil. They are particularly active against fungi from the genus of the Phycomycetes, for example against *Phytophthora infestans*. The curative and systemic activity, which has already been mentioned, should be singled out particularly.

The acylating agents used as starting materials, defined by the formulae (III) and (IV), are generally known.

Possible diluents for the reaction according to the invention include all inert organic solvents. These include, for example, hydrocarbons, such as benzine, ligroin, hexane, benzene and toluene; chlorinated hydrocarbons, such The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides or insecticies, acarcides, rodenticides, bactericides, nematocides, herbicides, fertilizers, bird repellents, growth-enhancing compounds, growth-regulating agents, agents for improving soil structure, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–0.1%, preferably 0.005–2%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance, e.g. about 20–100% by weight of the active compound.

Furthermore, the present invention contemplates methods of selectively killing, combating or controlling pests, e.g. fungi, which comprises applying to at least one of correspondingly (a) such fungi, and (b) the corresponding habitat thereof, i.e. the locus to be protected, a correspondingly combative or toxic amount, i.e. fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Phytophthora test

Solvent: 4.7 parts by weight of acetone.
Dispersing agent: 0.3 part by weight of alkylaryl-polyglycol ether.
Water: 95 parts by weight.
The amount of the active compound required for the desired concentration of the active compound in the spray liquid was mixed with the stated amount of solvent and the concentrate was diluted with the stated amount of water which contained the stated additions.

Young tomato plants (Bonny Best) with 2–6 foliage leaves were sprayed with the spray liquid until dripping wet. The plants remained in a greenhouse for 24 hours at 20° C. and at a relative atmospheric humidity of 70%. The tomato plants were then inoculated with an aqueous spore suspension of *Phytophthora infestans*. The plants were brought into a moist chamber with an atmospheric humidity of 100% and a temperature of 18–20° C.

After 5 days the infection of the tomato plants was determined as a percentage of the untreated but likewise inoculated control plants: 0% means no infection; 100% means that the infection was exactly as great as in the case of the control plants.

The active compounds, the concentrations of the active compounds and the results can be seen from Table 1.

TABLE 1.—PHYTOPHTHORA TEST

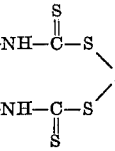

The active compounds, the concentrations of the active compounds and the results can be seen from Table 2.

TABLE 2.—PHYTOPHTHORA TEST/SYSTEMIC

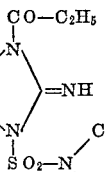

EXAMPLE 2

*Phytophthora* test/systemic

Solvent: 4.7 parts by weight of acetone.

Dispersing agent: 0.3 part by weight of alkylaryl-polyglycol ether.

Water: 95 parts by weight.

The amount of the active compound required for the desired concentration of the active compound in the watering liquid was mixed with the stated amount of the solvent and the concentrate was diluted with the stated amount of water which contained the stated additives.

Tomato plants which had been grown in standard soil, in the 2–3 leaf stage, were watered three times over the course of one week with 20 ml. of the watering liquid, containing the stated concentration of active compound, per 100 cc. of soil.

After the treatment, the plants treated in this way were inoculated with an aqueous spore suspension of *Phytophthora infestans* de By. Thereafter the plants were brought into a humidity chamber at an atmospheric humidity of 100% and a temperature of 18–20° C. After 3–5 days the infection of the tomato plants was determined as a percentage of the untreated but also inoculated control plants. 0% denotes no infection and 100% denotes that the infection was exactly as great as in the case of the control plants.

EXAMPLE 3

*Phytophthora* test/curative

Solvent: 4.7 parts by weight of acetone.

Dispersing agent: 0.3 part by weight of alkylaryl-polyglycol ether.

Water: 95 parts by weight.

The amount of the active compound required for the desired concentration of the active compound in the preparation batch was mixed with the stated amount of the solvent and the concentrate was diluted with the stated amount of water, which contained the stated additives.

Pinnules were taken from tomato plants (Bonny Best variety) and were placed, with the top face pointing upwards, in Petri dishes, the lid and bottom of which were provided with moist blotting paper. The pinnules which had been introduced were sprayed with an aqueous spore suspension of *Phytophthora infestans* and were incubated for 6 hours at 20° C. with the dish closed. Thereafter the leaves were dipped into the preparation batch prepared in accordance with the above process. The dipping time was 15 seconds.

After again incubating for 3 days at 20° C. with the dish closed, the infection on the treated pinnules was determined as a percentage of the infection of the untreated but also inoculated pinnules (=control). 0% denotes no infection and 100% denotes that the infection was exactly as great as in the case of the control.

The active compounds, the concentrations of the active compounds and the results can be seen from Table 3.

TABLE 3.—PHYTOPHTHORA TEST/CURATIVE

| Active compound | Infection in percent of the infection of the untreated control at an active compound concentration (in percent by weight) of 0.1 |
|---|---|
| (A) CH₂—NH—C(=S)—S\Zn/S—C(=S)—NH—CH₂ (known) | 100 |
| benzimidazoline with CO—C₂H₅ and SO₂—N(CH₃)₂ | 18 |
| benzimidazoline with CO—C₆H₅ and SO₂—N(CH₃)₂ | 19 |

EXAMPLE 4

(a) 2-amino-1-dimethylaminosulfonyl-benzimidazole required as starting material was obtained in the following manner: 66.5 g. (0.5 mole) of 2-aminobenzimidazole were initially introduced into 200 ml. of chloroform. 71.75 g. (0.5 mole) of dimethylsulfamic acid chloride were added dropwise thereto, followed by 50.5 g. (0.5 mole) of triethylamine. The temperature was kept at 25 to 30° C. Thereafter the mixture was kept at the boil for one hour and when it had cooled the product was filtered off, throughly washed with water and dried in a vacuum drying cabinet at 75° C. 95 g. (79% of theory) of 1-dimethylaminosulfonyl-2-aminobenzimidazole were obtained. The substance could be purified by recrystallization from alcohol; melting point 207–208° C.

(b)

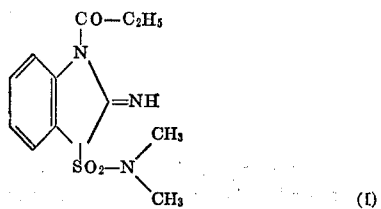

(I)

482 g. (2 moles) of 2-amino-1-dimethylaminosulfonyl-benzimidazole obtained in (a) were mixed with 220 g. of triethylamine in one liter of dioxane. 185 g. (2 moles) of propionic acid chloride were added to this mixture which was subsequently heated to the boil under reflux for 3 hours. The resulting mixture was poured into 3 liters of water and the precipitate was filtered off, washed with water and dried. 330 g. (55% of theory) of 1-dimethyl-aminosulfonyl-2-imino-3-propionylbenzimidazoline were obtained and could be purified by crystallization from aqueous alcohol. Melting point 110° C. Toxicity (oral administration to rats): $LD_{50} > 2.500$ mg./kg.

EXAMPLE 5

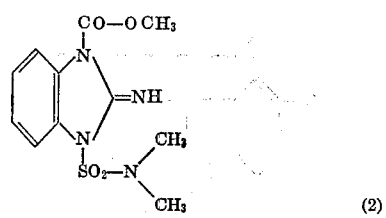

(2)

48.2 g. (0.2 mole) of 2-amino-1-dimethylaminosulfonylbenzimidazole were suspended in 50 ml. of pyrocarbonic acid dimethyl ester. The substance briefly dissolved, with evolution of carbon dioxide, and thereafter a white precipitate separated out. This was filtered off and well washed with ether. 42 g. (70% of theory) of 1-dimethylaminosulfonyl-2-imino - 3 - methoxycarbonyl-benzimidazoline were obtained and could be purified by recrystallization from acetonitrile. Melting point 117° C. (with decomposition).

EXAMPLE 6

The following compounds were obtained in a similar manner to that of Examples 4 and 5.

| Formula | | Melting point (° C.) |
|---|---|---|
| benzimidazoline with N—COCH₂—OC₂H₅ and SO₂—N(CH₃)₂ | (3) | 162–166 |
| benzimidazoline with CO—C₆H₅ and SO₂—N(CH₃)₂ | (4) | 148–149 |
| benzimidazoline with COCH₃ and SO₂—N(CH₃)₂ | (5) | 118–119 |
| benzimidazoline with N—COC₃H₇ and SO₂—N(CH₃)₂ | (6) | 109–111 |
| benzimidazoline with CO—CH(CH₃)₂ and SO₂—N(CH₃)₂ | (7) | 109–111 |
| benzimidazoline with N—COC₂H₅ and SO₂—N(morpholino) | (8) | 121–123 |

TABLE—Continued

| Formula | | Melting point (°C.) |
|---|---|---|
| (structure 9) Cl-benzimidazoline with N—COC₂H₅, =NH, SO₂—N(CH₃)₂ | (9) | 143–144 |
| (structure 10) CH₃O-benzimidazoline with N—COC₂H₅, =NH, SO₂—N(CH₃)₂ | (10) | 150–155 |
| (structure 11) CH₃-benzimidazoline with N—COC₂H₅, =NH, SO₂—N(CH₃)₂ | (11) | 125–127 |
| CO—OCH₃ / =NH / SO₂—N(CH₃)₂ | (12) | 117 |
| CO—OC₃H₇-i / =NH / SO₂—N(CH₃)₂ | (13) | 120 |
| CO—OC₄H₉-i / =NH / SO₂—N(CH₃)₂ | (14) | 125 |
| CO—OC₄H₉-sec. / =NH / SO₂—N(CH₃)₂ | (15) | 123 |
| CO—OC₃H₇-n / =NH / SO₂—N(CH₃)₂ | (16) | 128 |
| CO—OC₄H₉-n / =NH / SO₂—N(CH₃)₂ | (17) | 115 |

It will be appreciated that the instant specification and examples are set forth by way of illustration and not limitation, and that various modifications and changes may be made without departing from the spirit and scope of the present invention.

What is claimed is:

1. A 1-acyl-3-aminosulfonyl-2-imino-benzimidazoline of the formula

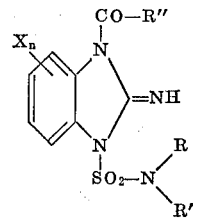

in which

X is halogen, lower alkyl or lower alkoxy, n is 0, 1 or 2,

R and R' each independently is alkyl of 1 to 6 carbon atoms, or

R and R' together with the linking nitrogen atom are pyrrolidino, piperidino or morpholino, or R'' is alkyl of 1 to 6 carbon atoms optionally substituted by lower alkoxy or halogen, cycloalkyl of 3 to 8 carbon atoms, benzyl or phenyl optionally substituted by at least one of chlorine or methyl, or alkoxy of 1 to 6 carbon atoms.

2. A compound according to claim 1 in which X is chlorine, bromine, fluorine, methyl, ethyl, isopropyl, n-butyl, methoxy, ethoxy or isopropoxy; n is 0 or 1; R and R' each independently is methyl, ethyl or n-propyl, or R and R' together with the linking nitrogen atom are pyrrolidino, piperidino or morpholino; and R'' is lower alkyl optionally substituted by methoxy or ethoxy, cyclohexyl, benzyl or phenyl optionally substituted by at least one of chlorine and methyl, or alkoxy of up to 3 carbon atoms.

3. The compound according to claim 1 wherein such compound is 1-dimethylaminosulfonyl-2-imino-3-propionylbenzimidazoline of the formula

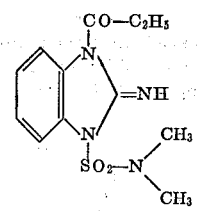

(1)

4. The compound according to claim 1 wherein such compound is 1-dimethylaminosulfonyl-2-imino-3-benzoyl-benzimidazoline of the formula

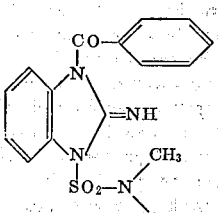

(4)

5. The compound according to claim 1 wherein such compound is 1-dimethylaminosulfonyl-2-imino-3-isobutyrylbenzimidazoline of the formula

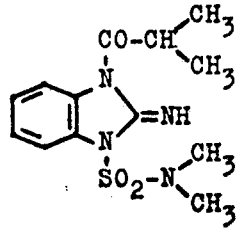

References Cited
FOREIGN PATENTS
1,152,531  5/1969  Great Britain _____ 260—309.2

OTHER REFERENCES

Ben-Ishai et al.: Chem. Abst., vol. 70, No. 96715f (1969).
Cohen et al.: Chem. Abst., vol. 57, col. 7274 (1962).
Dittmar: Chem. Abst., vol. 76, No. 140813m (1972).
Farbenfabriken Bayer A. G.: Chem. Abst., vol. 61, col. 8321 (1964).
Klopping: Chem. Abst., vol. 55, col. 3617 (1961).

NATALIE TROUSOF, Primary Examiner

U.S. Cl X.R.

260—247.1 L, 293.6; 424—248, 267, 273